US010671373B1

(12) United States Patent
Walker et al.

(10) Patent No.: US 10,671,373 B1
(45) Date of Patent: Jun. 2, 2020

(54) MECHANISM FOR AUTOMATICALLY INCORPORATING SOFTWARE CODE CHANGES INTO PROPER CHANNELS

(71) Applicant: MICROSOFT TECHNOLOGY LICENSING, LLC, Redmond, WA (US)

(72) Inventors: Shepherd Tate Walker, Seattle, WA (US); Harry P. Ferguson, Seattle, WA (US); Jeremy Haubold, Portage, IN (US)

(73) Assignee: Microsoft Technology Licensing, LLC, Redmond, CA (US)

( * ) Notice: Subject to any disclaimer, the term of this patent is extended or adjusted under 35 U.S.C. 154(b) by 0 days.

(21) Appl. No.: 16/236,628

(22) Filed: Dec. 30, 2018

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
None
See application file for complete search history.

(56) References Cited

U.S. PATENT DOCUMENTS

| 6,199,204 | B1 | 3/2001 | Donohue | |
| 6,757,893 | B1* | 6/2004 | Haikin | G06F 8/71 717/170 |
| 6,769,115 | B1 | 7/2004 | Oldman | |
| 8,490,054 | B2* | 7/2013 | Dattathreya | G06F 8/71 717/101 |
| 8,719,785 | B2* | 5/2014 | Tannous | G06F 8/71 717/106 |
| 8,838,707 | B2 | 9/2014 | Lawson et al. | |
| 9,128,805 | B2 | 9/2015 | Michaely et al. | |
| 2004/0230964 | A1* | 11/2004 | Waugh | G06F 8/77 717/168 |
| 2007/0226755 | A1* | 9/2007 | Kilian-Kehr | G06F 8/71 719/318 |
| 2011/0125798 | A1* | 5/2011 | Misch | G06F 8/71 707/785 |
| 2011/0289499 | A1* | 11/2011 | Haubold | G06F 8/65 717/173 |
| 2013/0055233 | A1* | 2/2013 | Hatton | G06F 8/71 717/170 |

(Continued)

OTHER PUBLICATIONS

"How do I Take Advantage of Release Channels?", Retrieved from: <<https://cloud.google.com/container-optimized-os/docs/concepts/release_channels#how_do_i_take_advantage_of_release_channels>>, Retrieved on: Jan. 9, 2019, 3 Pages.

(Continued)

*Primary Examiner* — Philip Wang
(74) *Attorney, Agent, or Firm* — NovoTechIP International PLLC (57) ABSTRACT

A method of and system for incorporating a source code change made in a first branch of a source code configuration into a second branch of the source code configuration is carried out by detecting that the change was made to the first branch, identifying the second branch as a branch of the source code configuration that does not include the change, automatically incorporating the change into the second branch, determining if the automatic incorporation of the change was successful, and notifying an individual if the automatic incorporation was unsuccessful such that manual incorporation may be performed.

20 Claims, 7 Drawing Sheets

(56) References Cited

U.S. PATENT DOCUMENTS

| | | | |
|---|---|---|---|
| 2014/0297592 A1* | 10/2014 | Ohtake | G06F 16/219 |
| | | | 707/638 |
| 2014/0344557 A1 | 11/2014 | Bartlow et al. | |
| 2016/0062876 A1* | 3/2016 | Narayanan | G06F 11/3684 |
| | | | 717/130 |
| 2016/0291970 A1* | 10/2016 | Mallisetty | G06F 8/71 |
| 2017/0212751 A1 | 7/2017 | Mak et al. | |
| 2018/0121293 A1* | 5/2018 | Phillips | G06F 11/1451 |
| 2019/0303139 A1* | 10/2019 | Pechacek | G06F 3/04817 |

OTHER PUBLICATIONS

Kim, et al., "Dynamic Software Updates for Parallel High Performance Applications", In Proceedings of Concurrency and Computation: Practice and Experience, vol. 23, Issue 4, Mar. 25, 2011, 26 Pages.

Procida, Daniele, "Software Release Channels on Divio Cloud", Retrieved from: <<https://www.divio.com/blog/software-release-channels-on-aldryn/>>, Retrieved on: Jan. 9, 2019, 2 Pages.

Michaely, et al., "Risk and Dependency Tracking and Control System", Application as filed in U.S. Appl. No. 16/124,686, filed Sep. 7, 2018, 46 Pages.

Dampier, et al., "Automated Merging of Software Prototypes", In Journal of Systems Integration, vol. 4, Issue 1, Feb. 28, 1994, pp. 33-49.

"International Search Report and Written Opinion Issued in PCT Application No. PCT/US2019/068214", dated Mar. 25, 2020, 13 Pages.

\* cited by examiner

MECHANISM FOR AUTOMATICALLY INCORPORATING SOFTWARE CODE CHANGES INTO PROPER CHANNELS

TECHNICAL FIELD

This disclosure relates generally to incorporating software code changes into proper code branches and, more particularly, to an improved method of and system for determining if a software code change should be incorporated into a code branch and if so initiating the change automatically.

BACKGROUND

Complex software codes generally go through a validation and deployment process before they are finally released. During this process, there may be instances when a released, or soon-to-be released version of the software code requires last minute changes. As there may be multiple groups and developers working on the code, these changes may be made in different versions of the software code. For example, a developer may make a change to a version of the code undergoing deployment. However, unless this change is incorporated back to a master version, future versions of the code may not include this change. Furthermore, any versions of the code that were branched off of the master before the change is incorporated may also not include the change. This can cause problems and inconsistencies between the different versions of the code.

Traditionally, keeping track of changes that need to be incorporated to various branches of the software code has been done manually by one or more administrators or project managers. Alternatively, a developer who makes a change may have been designated as being responsible for ensuring the change is incorporated into all relevant branches. This is a cumbersome and inefficient process as many last-minute changes may be made to various versions of a software code. Moreover, the process is error-prone as it relies on one or more individuals to keep track of all required changes.

Hence, there is a need for an improved method and system for incorporating software code changes into proper software branches.

SUMMARY

In one general aspect, the instant application describes a device having one or more processors, and a memory in communication with the processors where the memory comprises executable instructions that, when executed by the processors, cause the device to perform multiple functions. The function may include receiving a notification from an event tracking application via a network, the notification indicating that a change was made to a first branch of a source code configuration and the notification being sent by the event tracking application upon receiving information from a source depository server, identifying a second branch of the source code configuration that does not include the change, automatically incorporating the change into the second branch, determining if the automatic incorporation of the change was successful, and transmitting a first indication to a work tracking application to update a task entry depending on results of the determining if the automatic incorporation of the change was successful In another general aspect, the functions executed by the processors may also include upon receiving the notification, sending a second indication to the work tracking application to create the task entry for the change or sending a third indication to the work tracking application to update the task entry to initiate notifying an individual if it is determined that the automatic incorporation is unsuccessful. In yet another general aspect, the functions executed by the processors may also include identifying one or more primary branches of the source code configuration, examining the identified primary branches to identify active branches among the identified primary branches, examining the identified active branches to detect branches that were created in the source code configuration after the first branch, comparing a source code of the detected branches to a source code of a merged root of the first branch with a master branch of the source code to determine if there are differences between the detected branches and the merged root, and designating any branch identified as having differences as the second branch.

In another general aspect, the instant application describes a describes a method for incorporating a source code change made in a first branch of a source code configuration into a second branch of the source code, where the method includes the steps of receiving a notification from an event tracking application via a network, the notification indicating that a change was made to the first branch and the notification being sent by the event tracking application upon receiving information from a source depository server, identifying the second branch as a branch of the source code configuration that does not include the change, automatically incorporating the change into the second branch, determining if the automatic incorporation of the change was successful, and transmitting a first indication to a work tracking application to update a task entry depending on results of the determining if the automatic incorporation of the change was successful.

In yet another general aspect, the method may include the steps of upon receiving the notification, sending a second indication to the work tracking application to create the task entry for the change or sending a third indication to the work tracking application to update the task entry to initiate notifying an individual if it is determined that the automatic incorporation is unsuccessful. The method may further include the steps of identifying one or more primary branches of the source code configuration, examining the identified primary branches to identify active branches among the identified primary branches, examining the identified active branches to detect branches that were created in the source code configuration after the first branch, comparing a source code of the detected branches to a source code of a merged root of the first branch with a master branch of the source code to determine if there are differences between the detected branches and the merged root, and designating any branch identified as having differences as the second branch.

In one general aspect, the instant application describes a device having one or more processors, and a memory in communication with the processors where the memory comprises executable instructions that, when executed by the processors, cause the device to perform multiple functions. The function may include receiving a notification from an event tracking application via a network, the notification indicating that a first branch was created in a source code configuration and the notification being sent by the event tracking application upon receiving information from a source depository server, identifying a second branch in the source code configuration that was created before the first branch, determining if a change was made to the second branch after creation of the first branch, upon determining the change was made to the second branch, determine if the change exists in the first branch, automatically incorporating the change into the first branch, upon determining that the change does not exist in the first branch.

In another general step the functions may include identifying one or more primary branches of the source code configuration, examining the identified primary branches to identify active branches among the identified primary branches, examining the identified active branches to detect branches that were created in the source code configuration before the first branch.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Source codes that are generated by a group of developers and then released for use often undergo a process of validation and deployment to ensure that they work properly and are ready for wider use. As issues are discovered during the validation and deployment process, various changes may be made by different developers until the very last minute before the code is deployed. To make matters more complicated, there are often different active release channels (e.g. different versions of the code that undergo validation and deployment) for a software code. Since different developers may be making a variety of changes to each of the different release channels, it is important to keep track of all changes to ensure the changes are incorporated to all future versions of the code. This is often done manually by one or more developers or individuals in charge of the process. However, in a fast-paced environment where many changes may be taking effect, it may be easy to lose track of some. Furthermore, the process may be time-consuming and labor intensive.

To address these issues and more, in an example, this description provides technology implemented for an improved method and system of incorporating software code changes into proper software branches. To improve the current methods of incorporating such changes, the technical solution enables automatic detection of a change made to a relevant software channel, automatic identification of software channels to which the change should be incorporated in, and automatically initiating the incorporation process. Automatically detecting the change(s) may involve having services setup to understand when a change is being made to a specific software channel. Automatically identifying the software channels to which the change should be applied, on the other hand, may involve performing change comparisons between the initially changed channel and all forthcoming versions against a common ancestor. Initiating the incorporation process may involve initiating automatic porting of the change into any identified software channel and keeping track of the porting process to create a work item and assign it to a specific person when an issue is identified. For example, if a problem is detected with the porting process, a work item artifact may get opened and assigned to the original change owner in order to track where the change needs to be ported to. As a result, the solution provides an efficient, accurate and easy method of keeping track of changes made to various software code versions, determining when changes should be applied to other versions and automatically initiating the change as needed.

As will be understood by persons of skill in the art upon reading this disclosure, benefits and advantages provided by such implementations can include, but are not limited to, a solution to the technical problems of inefficient, labor intensive and unreliable incorporation of changes made to a version of software code to various other versions. Technical solutions and implementations provided here optimize and improve the process of incorporating software code changes into proper software branches. The benefits provided by these solutions include providing increased accuracy, reliability and efficiency in incorporating software code changes into proper software branches and reducing the amount of human labor and oversight needed for such processes.

Figure 1:
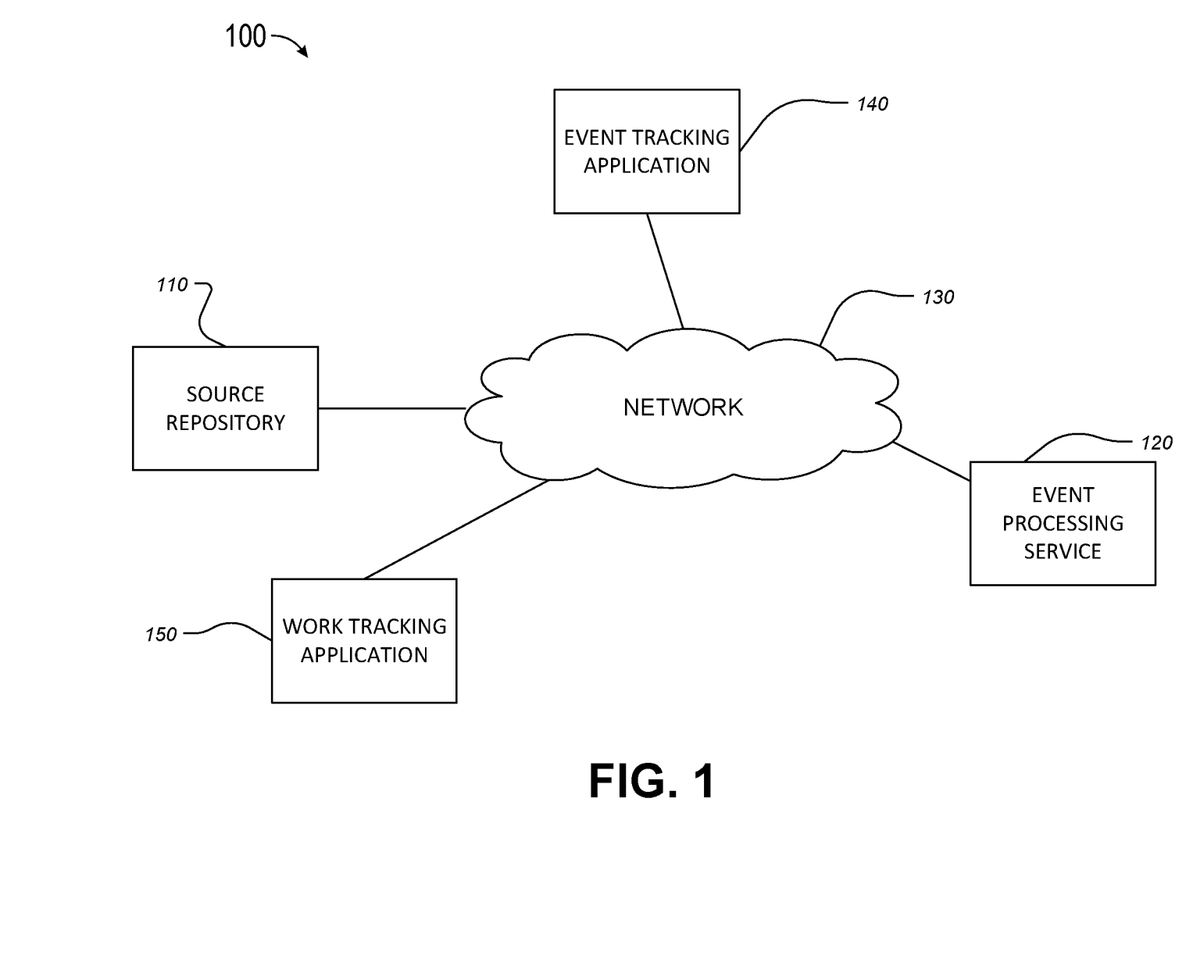
FIG. 1 illustrates an example system upon which aspects of this disclosure may be implemented.

FIG. 1 illustrates an example system 100, upon which aspects of this disclosure may be implemented. The system 100 may be implemented in a single site or spread out in a number of buildings or geographically separated locations. The system 100 may include a source repository 110, an event processing service 120, an event tracking application 140 and a work tracking application 150, all connected to a network 130. The network 130 may be a wired or wireless network or a combination of wired and wireless networks that connects one or more elements of the system 100.

The source repository 110 may be a version-control system for tracking changes in computer files (e.g., software code files) and coordinating work on those files among multiple individuals. The source repository 110 may be used to store and/or manage source-code in software development, by for example, storing and keeping track of various versions of the source-code and any changes made to each of those versions. In one implementation, the source repository 110 may be an external source repository such as industry known Git repository or Azure DevOps which can be used by multiple organizations to manage their source-code development. Alternatively, the source repository 110 may be an internal repository for each organization.

Each change to one or more versions of the source-code in the source repository 110 may be identified as an event by the source repository 110. Each identified event may be sent to the event tracking application 140 by the source repository 110 for tracking and processing purposes. In one implementation, the event tracking application 140 may function as a tracking program that keep tracks of the status of events. For example, the event tracking application 140 may function in a similar manner as an Azure server bus. Upon receiving notification of an event, the event tracking application may create a record (e.g., an entry or log in a database) for the event which may identify the type of event, the version of the code to which it was made, the time it was generated, status of the change and/or any other pertinent information available about the change, before forwarding information about the event to the event processing service 120 for further processing. In this manner, the event tracking application 140 may function as an intermediary between the source depository 110 and the event processing service 120.

The event processing service 120 may function as an application for processing events (e.g., changes to source-code). To effectively process the events, the event processing service 120 may have access to information on the different branches (e.g., versions) of the source-code and how they are structured within the source repository 110, such that when a change event is applied to a branch that is associated with a release in the source repository 110, the event processing service 120 can determine what branches (e.g., other versions) the change should be applied to. This may be done by first identifying candidate branches to which the change may need to be applied and then determining if the change is already included in each candidate branch by using for example a control system. The control system may be related to the source depository 110 that utilizes a native differencing logic to the candidate branch to identify target branches. Once target branches that do not contain the change are identified by the event processing system 120, a continuous integration testing may be performed to ensure there are no logical conflicts by the change being applied to target branches. The event processing service 120 may then automatically apply the change(s) that have successfully passed continuous integration testing to the target branches. For any target branches that do not pass the continuous integration testing or for which any other issues are encountered during the incorporation process, a notification may be sent to the work tracking application 150.

The work tracking application 150 may function as an external work tracking program that keeps track of work item statuses, enables assignment of the work items to one or more individuals and/or provides notifications regarding the work items. In one implementation, upon receiving a notification from the event processing service 120, the work tracking application 150 may create a work log for the item and automatically assign one or more individuals to the item. The individual(s) may for example be the developer(s) who generated the original change in the source repository 110 and one or more others who are in charge of the project. The work tracking application 150 may be configured to set up automatic reminders and escalation mechanisms for ensuring that the work item is performed in a timely manner. Once a work item in the work tracking application 150 is indicated as closed, the information may be conveyed back to the event processing service 120, which may in turn notify the event tracking application 140 to update its status of the event accordingly.

In one implementation, one or more servers may be configured to execute functions of each of the source repository 110, an event processing service 120, an event tracking application 140 and a work tracking application as disclosed herein. Alternatively, one or more of the functions may be done by a user device(s) connected locally or remotely to the network 130.

Figure 2:
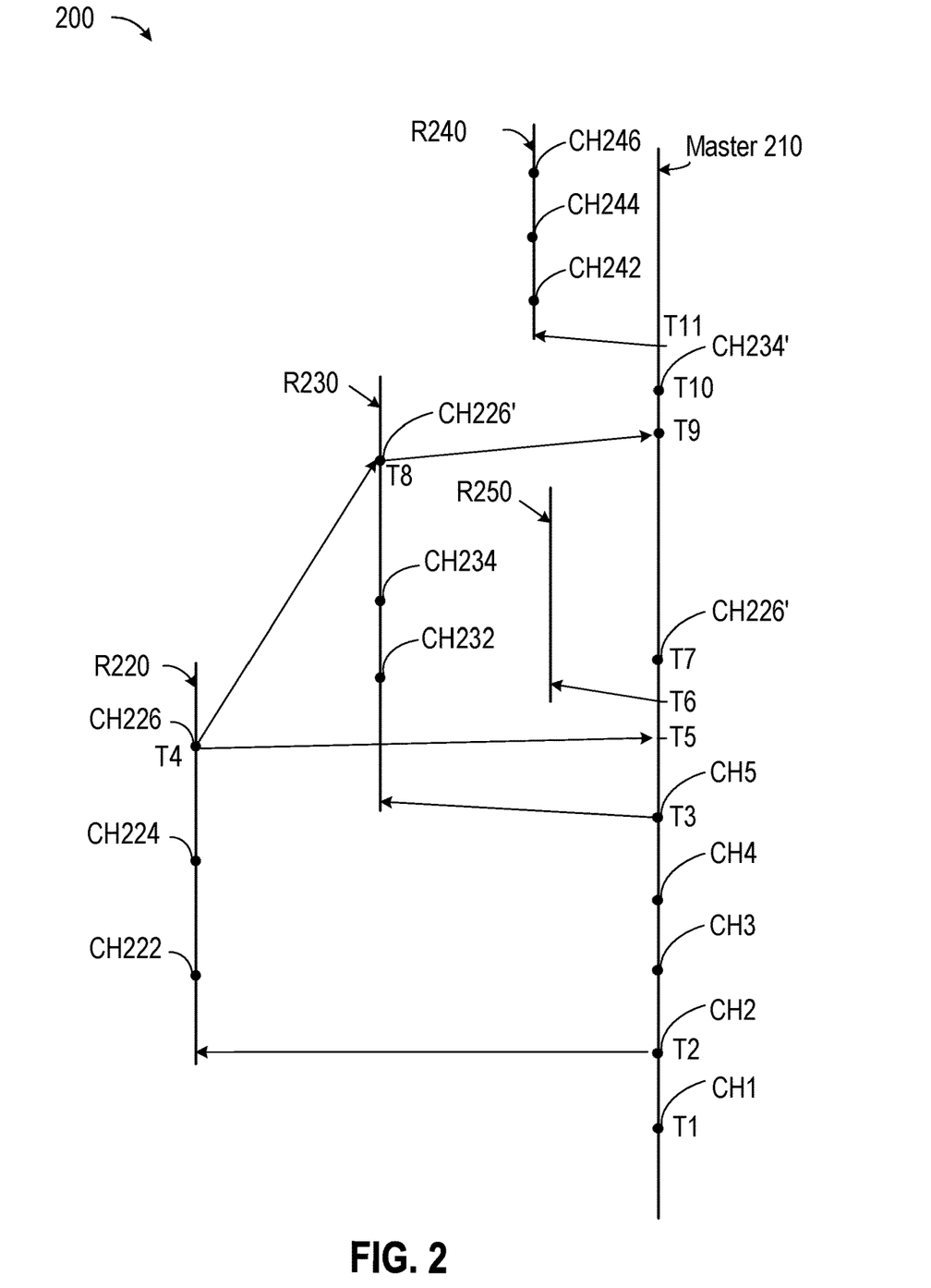
FIG. 2 depicts an example source code configuration having various branches and change events upon which aspects of this disclosure may be implemented.

FIG. 2 depicts an example source code configuration 200 having various branches and change events upon which aspects of this disclosure may be implemented. The example source code configuration 200 includes a master (e.g., trunk) version 210, and four release branches R220, R230, R240 and R250. The master branch 210 may include multiple changes such as CH1, CH2, CH3, CH4, and CH5, each illustrated by a dot in the tree branch. CH1 may occur at time T1 and CH2 may occur at time T2. After change CH2 is made to the master 210, the release branch R220 may be branched off, for example, for validation/deployment purposes. As discussed above, the validation/deployment process may be lengthy in time. During the process, one or more changes such as CH222, CH224 and CH226 may be made to the release branch R220 directly. These changes may be made to the release branch R220 as the release branch goes through validation. For example, it may be discovered during the validation process that change CH2 causes a configuration issue in the code. This may first be discovered during the validation process of the release branch R220 since CH2 was made to the source code right before the release branch R220 was branched off. In response, a developer may be assigned the task of creating a fix to address the issue. This fix may be instituted in the change CH226 which is applied to the release branch R220 at time T4. The release branch R220 may then proceed to deployment without any other changes.

While the release branch R220 is undergoing validation and deployment, other changes may be made to the master branch 210. For example, changes CH3, CH4 and CH5 may be made to the master branch 210 after release branch R220 is branched off to address one or more issues that are discovered separately from issues identified during validation of the release branch 210. As a result, there are now changes that have been made to the release branch R220 that are not available in the master branch 210 and changes in the master branch 210 that are not applied to the release branch R220. However, since the master branch 210 is the trunk used for all future releases, it is important that the changes made to the release branch R220 are incorporated back to the master branch 210. To achieve this, the change may have to be applied back to the master branch 210. The process of applying the change to a different branch may be referred to as porting the change and is illustrated in FIG. 2 by the arrow pointing from T4 to T5. Thus, at time T5, the process of porting the change CH226 to master branch 210 may be initiated. It should be noted that CH226 is used for illustration/example purposes only. Any of the changes shown or applied to the release branch R220 may be ported back to the master branch 210 at different times. The process of porting a change to a different branch may take some time. For example, some time may be required to ensure the change does not cause any conflicts with any other changes made to the master branch 210 after the release branch R220 was branched off (e.g., CH3, CH4, CH5). This may involve performing an integration test to ensure the change can be integrated safely into the master branch 210. Thus, although the porting process is initiated at T5, it may not be completed until time T7 at which point CH226' appears in the master branch 210.

While the release branch 210 was being validated, changed and/or deployed, other branches may have been branched off of the master branch 210. For example, release branch R230 may be branched off at time T3 to ensure that a release branch including changes CH3, CH4 and CH5 is available for deployment. During validation and deployment process of release branch R230, other issues may be identified that requires changes CH232 and CH234. While these changes may address some issues identified in the release branch R230, they still may not address the problems resolved by CH226. Moreover, for consistency, it may be important to ensure that release branch R230 contains the change CH226. However, since release branch R230 was branched off after release branch R220 was branched off and before change CH226' was ported back to the master branch 210, change CH226 is not included in the release branch R230. Thus, a process may be needed to ensure that branches such as release branch R230 include changes such as CH226. In the example shown in FIG. 2, change CH226 is ported to release branch R230 at time T8. This may be done via the improved method and system of incorporating software code changes into proper software channels, disclosed herein.

Once change CH226' is incorporated into the release branch R230, the process of porting the changes made to release branch R230 back to the master branch 210 may be initiated at time T9. This process may be completed at time T10 at which point the master branch 210 may include change CH234' (and/or change CH232'). Then, a later time, T11, which is also a later point in the tree configuration, branch release R240 may be branched off of the master branch 210 for validation and/or deployment. Because branch release R240 was branched off after the changes from the release branches R220 and R230 were incorporated into the master branch 210, it may already contain those changes, along with all of the changes made to the master branch (e.g., CH1, CH2, CH3, CH4, CH5, CH226' and CH234'). As a result, at this point, the release branch R240 may not need to incorporate any changes. However, the changes made to the release branch R240 which include CH242, CH244 and CH246 may need to be incorporated back to the master branch and release branches R220, R230 and R250 (if they have not been deployed yet).

The source code configuration 200 also includes a release branch R250 which is branched off of the master branch 210 at time T6. As depicted on the master branch 210, time T6 occurs in between time T5 which is when the process of porting change CH226 into the master branch 210 is initiated and time T6 when the change takes effect. As a result, although it may appear that release branch R250 includes the change CH226' since it was branched off after time T5, in fact it does not include the change CH226'. As discussed below, this is a special scenario that may require an additional mechanism for ensuring that such release branches incorporate all required changes.

It should be noted that the example source code configuration 200 and its various branches and events are for illustration purposes. Many different variations of source code tree configurations are possible. Moreover, although the source code configuration 200 only shows the master branch and four release branches, it should be noted that most source code configurations include many other types of branches. For example, many developers may branch off a channel off of any of the active branches to perform their own development and/or testing.

Figure 3A:
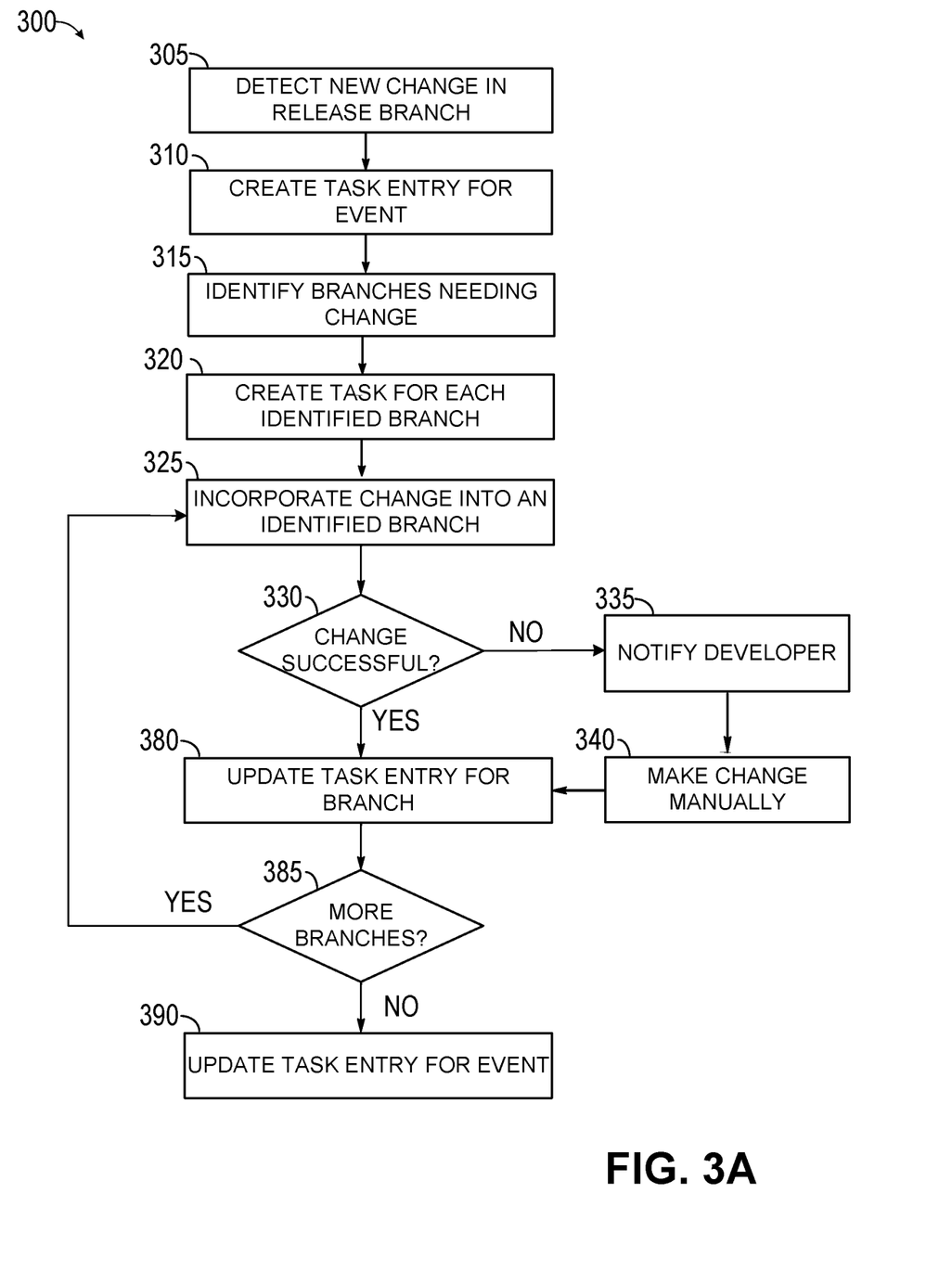
FIGS. 3A-3B are flow diagrams showing an example method for automatically ensuring software code changes are incorporated into proper software branch channels.
Figure 3B:
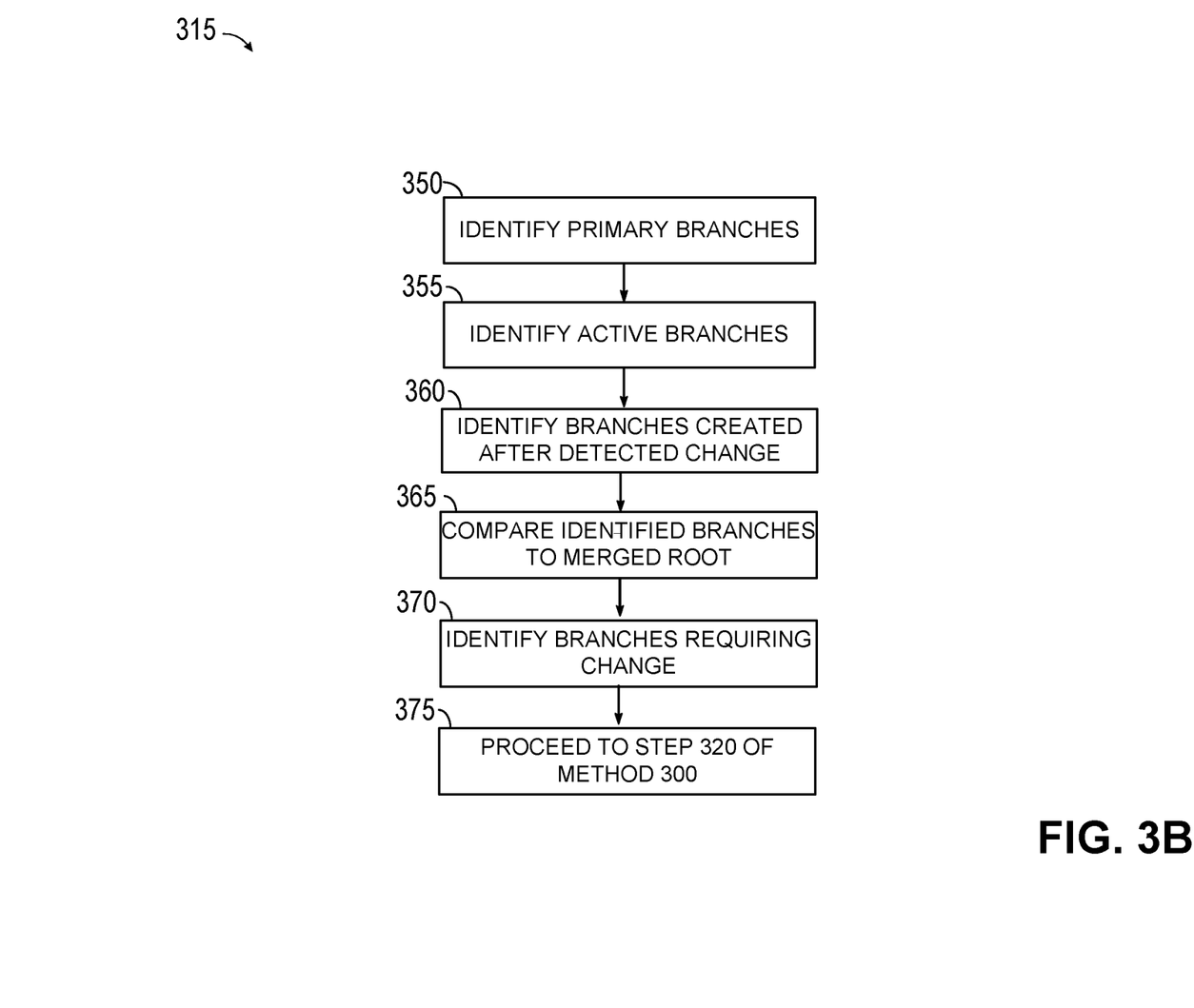

FIGS. 3A-3B are flow diagrams depicting an example method 300 for automatically ensuring software code changes are incorporated into proper software branch channels. At 305, method 300 begins by detecting a change made to a release branch in a source code configuration. This may occur, for example when a developer makes a change to a release branch of the source code while the release branch is the in the process of validation and/or deployment. The change to the release branch may be detected by one or more event tracking tools (e.g., webhooks) which monitor events that occur in a source repository (e.g., the source code management application managing the source code files) such as the source depository 110 of FIG. 1. For example, one or more services or event tracking tools such as the event tracking application 140 of FIG. 1 may be used to subscribe to (e.g., detect) events in the source repository. These events may be filtered by one or more filters to identify ones that are changes being made to a release branch in the source code. When an event (e.g., a change) is identified as a change being made to a release branch in the source repository, it may be reported to an event processing application and flagged for further processing. Alternatively, the change may be detected through other mechanisms. For example, a developer may manually send a notification that a change to a release branch was made.

Once the change (which may also be referred to as an event) is detected, method 300 may create a task entry (e.g., work item) corresponding to the detected event, at 310. The task entry may be created to ensure there is a record of the event, and its status with respect to various branches can be checked and updated. In one implementation, the task entry is created in a work tracking application such as the work tracking application 150 of FIG. 1 and assigned to one or more individuals. Assigning the task (e.g., work item) to one or more humans may ensure accountability and establish a review process where a person may have the ability review the status of the event to ensure it was properly ported to applicable branches of the code.

After a task entry has been created for the change, branches of the source code that may need to incorporate the new change may be identified, at 315. To identify the applicable branches, one or more steps depicted in FIG. 3B may be performed. For example, first, release branches of the source code may be identified, at 350. This may be done by utilizing the source code configuration's naming convention. This is because most source code configurations use unique identifiers for default branches and scopes. For example, release branches may start with the letter R, while all other branches may have other naming conventions. As discussed above, there may be numerous branches that are out of scope in a source code configuration. Filtering the branches by naming convention to identify release branches and the master branch may eliminate irrelevant branches that are not important enough to be checked for every change. In one implementation, only release branches and master branches are identified, as those may be the branches that will be deployed for use and/or are used as a trunk for future release branches.

Once branches are filtered to identify release branches and the master branch, active branches among the identified branches may be identified, at 355. That is because, there may be one or more release branches in the source code configuration that are inactive. For example, a release branch that has already been deployed may have an inactive status. Furthermore, there may be release branches that were pulled back from deployment for various reasons. Those branches may also have inactive statuses. By identifying active release branches, unnecessary processing of irrelevant branches may be eliminated.

After active release branches are identified at step 355, the process may proceed to identify from among the active release branches those that were created (e.g., branched off of the source code tree) after the changed branch was branched off, at 360. For example, referring back to FIG. 2, assuming that the changed branch is release branch R220 and the change event in question is change 226, at this stage all active release branches that branched off of the master 210 after point CH2 may be identified. These may include release branches R230, R240 and R250. If there were release branches in the source code configuration 200 that branched off of the tree prior to point CH2, those would be eliminated at this stage. It should be noted that the term "after" when searching for active release branches that were created after the changed branch refers to points in the source code configuration tree and not just chronologically. This means that in searching for relevant branches the process examines the source code configuration tree and selects those branches that were created after point CH2 in the source code configuration. Through these processes of filtrations, relevant branches which may not include the requisite change but to which the change should be applied may be identified.

Referring back to FIG. 3B, after the relevant branches are identified, the source code in each of those branches may be compared to the source code at the point of merged root of the changed branch, at 365, to determine if each branch includes the requisite change. The point of merge root of the changed branch may be the point in the source code configuration when the changed branch is merged back with the root (e.g., master branch) to initiate porting the change(s) in the changed branch back to the root (e.g., master branch). In the example of FIG. 2 and release branch R220, this may be point T5 in the master branch 210. This may be because this is the point in the source code configuration where the root of all of the branches may begin including the requisite change. In one implementation, instead of examining the entire source code in each branch and comparing it to the source code in the merged root, only changes in each branch are compared to changes in the merged root. This may be done to increase efficiency and reduce the amount of time and resources required to perform the search and comparison. By comparing the identified branches to the code at the point of merged root, those branches that are missing and need the requisite change may be identified, at 370. In one implementation, if the identified branch is the master, when a change is made to a release branch, the method may automatically assume that the change should be ported back to the master.

After the branches requiring the change are identified, the process may proceed, at 375, to step 320 of method 300 (FIG. 3A) to create a task entry for each identified branch. This may be done to ensure that either an application or a user keeps track of all required changes. Once task entries are created for each identified branch, method 300 may incorporate the change into a first identified branch, at 325. This may be done automatically, for example by the event processing service of FIG. 1, which may automatically insert the change into a proper place in the source code in each of the identified branches. This would save time, resources and costs associated with having one or more individuals perform the process manually. Moreover, it may eliminate potential human errors and/or chances of a person overlooking a branch or forgetting to finish the task. However, there may be instances when because of configuration or compatibility issues, the process of incorporating the change cannot be completed automatically. To ensure such instances do not result in incomplete porting of changes, method 300 may proceed to determine, at 330, if the change was made successfully to the first identified branch.

When, it is determined, at 330, that the change was made successfully, method 300 may proceed to update the task entry created for that branch, at 380. This may be done automatically, such that a person does not have to get involved in the process unless desired or required because of an issue. For example, when it is determined that the change was successfully incorporated into the branch, method 300 may change the status of the task entry to closed to indicate the task entry is no longer active.

When, it is determined, however, at 330, that the change was not incorporated successfully into all the identified branches, method 300 may proceed to notify the developer and/or any other individual responsible for the task entry created for the change, at 335. This may be done to ensure that the proper individuals are aware of the issue and can review the process to ensure the change is incorporated properly into the relevant branches. In one implementation, the notification may also include information about the issue that prevented successful incorporation of the change into all identified branches, information on which branches successfully received the change and which ones did not, and/or any other available information that may provide helpful to a person responsible for ensuring the change is incorporate into all relevant branches. Furthermore, the notification may include mechanisms for reminding the developer about the need to complete the task and/or mechanisms for one or more other individuals to oversee the completion of the task, for example through a feature of the work tracking application.

After receiving the notification, the change may be incorporated manually into the identified branch, at 340. Once the change is made manually, the method may automatically determine, or the developer may notify the method, that the change was made successfully, at which point, method 300 may proceed to step 380 to update the task entry for that branch.

After the task entry for the first identified branch is updated (e.g., closed), method 300 may proceed to determine, at 385, if there are any more branches identified that require the change. When more branches exist, method 300 may return back to step 325 to incorporate the change into the next identified branch and repeat steps 325-385 for that identified branch. If it determined that no other identified branches still require the change, method 300 may proceed to update the task entry for the event, at 390, to indicate that all required changes for the event have been made.

It should be noted that, in one implementation, one or more steps of the method 300 are performed by the event processing service that may be responsible for managing events relating to source codes.

Because the process of method 300 compares the identified branches with the merged root at the point of merger, it may mistakenly eliminate branches that are created between the time porting of a change is initiated (e.g., the point of merger) and the time the change is successfully incorporated into the root. This is because it generally takes some time between when porting a change is initiated and when it is successfully completed. This amount of time may vary and may not be easy to determine and/or calculate. As a result, the point chosen as the point of comparison is normally the time when porting is initiated. However, because at the time porting is initiated, the root may still not include the change, a branch created between this time and when the change actually takes effect may not include the change but may still not be identified in the search and comparison step of method 300. To ensure such branches also receive all required changes, an additional mechanism may be employed.

Figure 4:
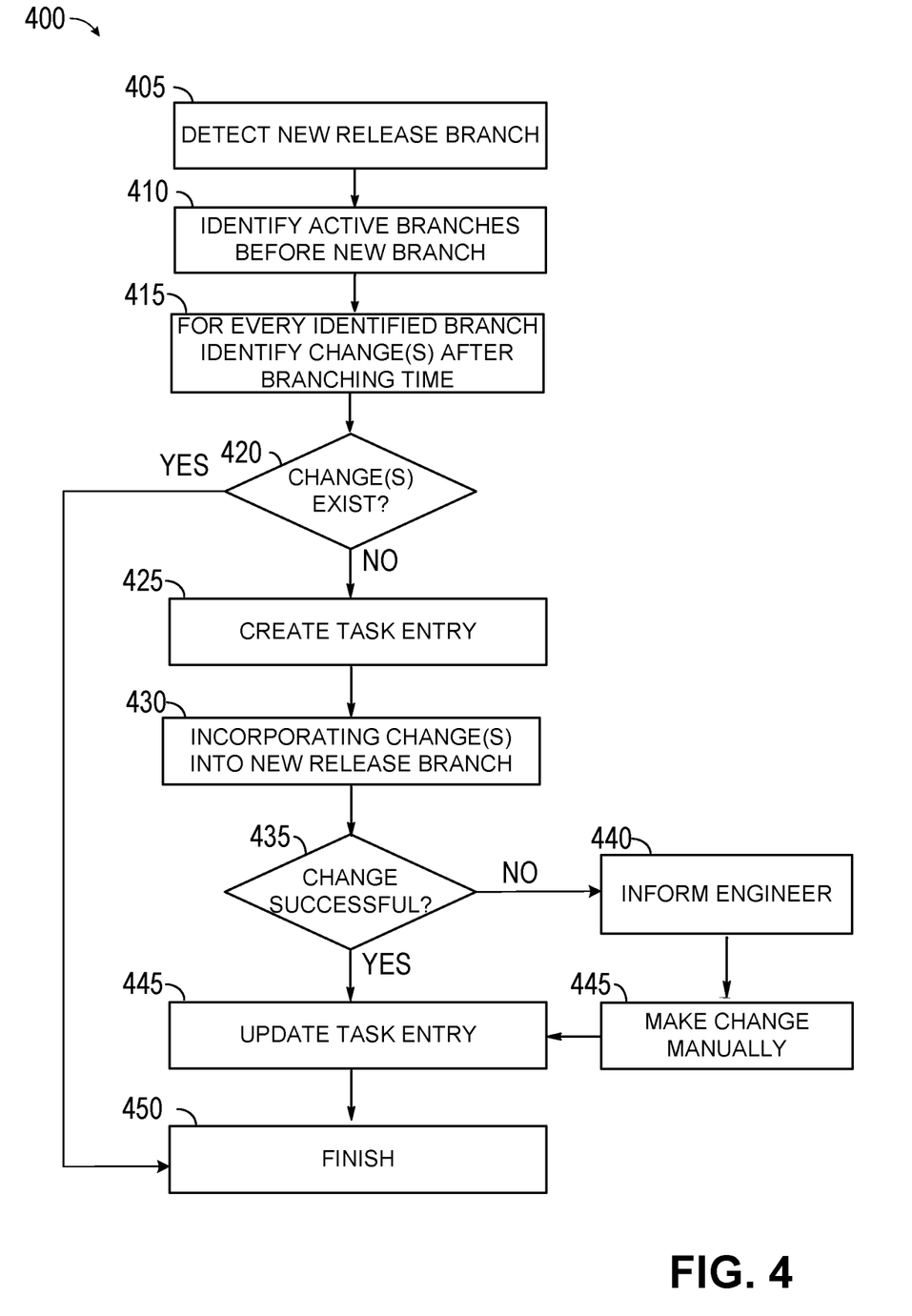
FIG. 4 is a flow diagram showing an example method for ensuring software code changes are incorporated into all proper software branch channels.

FIG. 4 is a flow diagram depicting an example method 400 for ensuring software code changes are incorporated into all proper software branch channels. At 405, method 400 may begin by detecting a new release branch in a source code configuration. This may occur, for example when a new release branch is created for deployment. The new release branch may be detected by one or more wevent tracking tools (e.g., webhooks) which monitor events that occur in a source repository (e.g., the source code management application managing the source code files) such as the source depository 110 of FIG. 1. For example, one or more services or event tracking tools may be used to subscribe to (e.g., detect) events in the source repository. These events may be filtered by one or more filters to identify ones that are creation of new release branches in the source code. When an event (e.g., a work item) is identified as a creation of a new release branch in the source repository, it may be reported to an event processing application and flagged for further processing. Alternatively, the new branch may be detected through other mechanisms. For example, one or more developers may manually send a notification that a new release branch was created.

Once the new branch is detected, method 400 may identify active release branches that were created before the new release branch, at 410. This may be done in multiple steps similar to those discussed in relation to FIG. 3B, where first, the master branch and release branches are identified via naming conventions, before identifying from among those active release branches and finally identifying from among the active release branches those that were created before the new branch. It should be noted that the master branch is also included in the list of identified branches at this step. Next, for every branch identified in step 410, method 400 may identify changes that were made to each branch after branching time of the current new branch, at 415.

Once all changes made to the identified branches after branching time are recognized, method 400 may proceed to determine, at 410, if each of the recognized changes exist in the new release branch. When it is determined that all recognized changes exist in the new release branch, method 400 may proceeds to finish the process, at 450.

When it is determined, however, that one or more of the recognized changes do not exist in the new release branch, method 400 may proceed to first create a task entry for each change not available in the new release branch, at 425, before incorporating each of those changes into the new release branch, at 430. The task entry may be created to ensure there is a record of the event, and its status with respect to various branches can be checked and updated. In one implementation, the task entry is created in a work tracking application such as the work tracking application 150 of FIG. 1 and assigned to one or more individuals. Assigning the task to one or more humans may ensure accountability and establish a review process where a person may have the ability review the status of the event to ensure it was properly ported to the new release branch. In one implementation, only one task entry is created for all of the incorporated changes. Alternatively, a separate task entry may be created for each unincorporated change.

The process of incorporating the change into the new release branch may be performed automatically, for example by the event processing service of FIG. 1, which may automatically insert the change(s) into a proper place in the source code of the new release branch. However, there may be instances when because of some issues, the process of incorporating the change(s) cannot be completed automatically. To ensure such instances do not result in incomplete porting of changes, method 400 may proceed to determine, at 435, if each of the changes was incorporated successfully to the new release branch.

When, it is determined, at 435, that all changes were made successfully, method 400 may proceed to update the task entry created for the change, at 445. This may be done automatically, such that a person does not have to get involved in the process unless desired or required because of an issue. For example, when it is determined that the change(s) were successfully incorporated into the branch, method 400 may change the status of the task entry to closed to indicate the task entry is no longer active.

When, it is determined, however, at 435, that one of the changes was not incorporated successfully into the new release branche, method 400 may proceed to notify the developer and/or any other individual responsible for the task entry created for the change, at 425. This may be done to ensure that the proper individuals are aware of the issue and can review the process to ensure the change is incorporated properly into the new release branch. In one implementation, the notification may also include information about the issue that prevented successful incorporation of the change into the branch and/or any other available information that may provide helpful to a person responsible for ensuring the change is incorporate properly. Furthermore, the notification may include mechanisms for reminding the developer about the need to complete the task and/or mechanisms for one or more other individuals to oversee the completion of the task, for example through a feature of the work tracking application. After receiving the notification, the change may be incorporated manually into the branch, at 455. Once the change is made manually, the method may automatically determine, or the developer may notify the method that the change was made successfully, at which point, method 400 may proceed to step 445 to update the task entry for that branch, before moving to finish the process, at 450.

Thus, in different implementations, an improved method and system may be provided to automatically determine if one or more changes made in one branch of a source code configuration should be incorporated into other branches of the source code and to enable automatic porting of the changes when it is determined that an incorporation is needed. In some implementations, the method may provide a mechanism for keeping track of all required changes and notifying a human when a change is not able to occur automatically.

Figure 5:
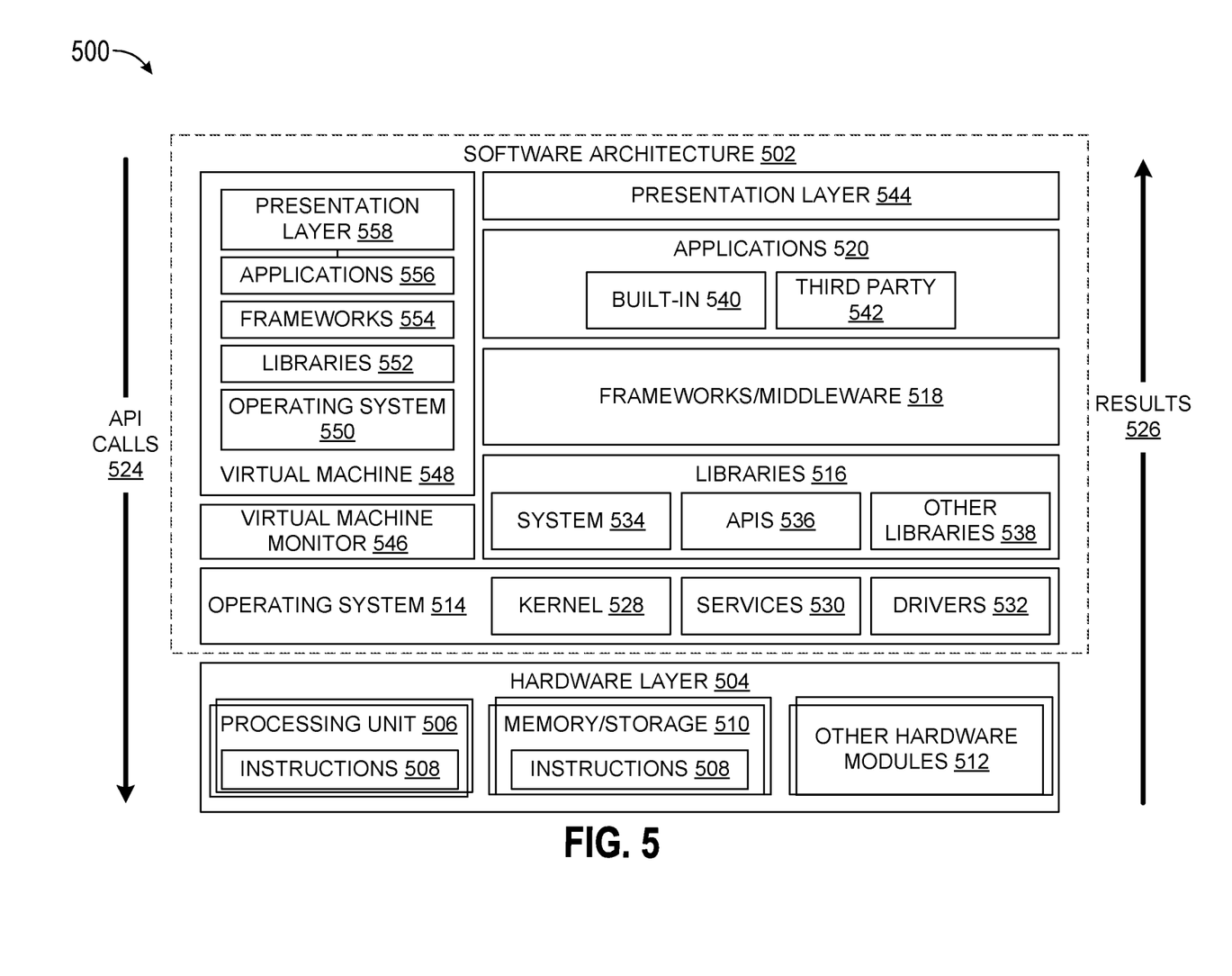
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
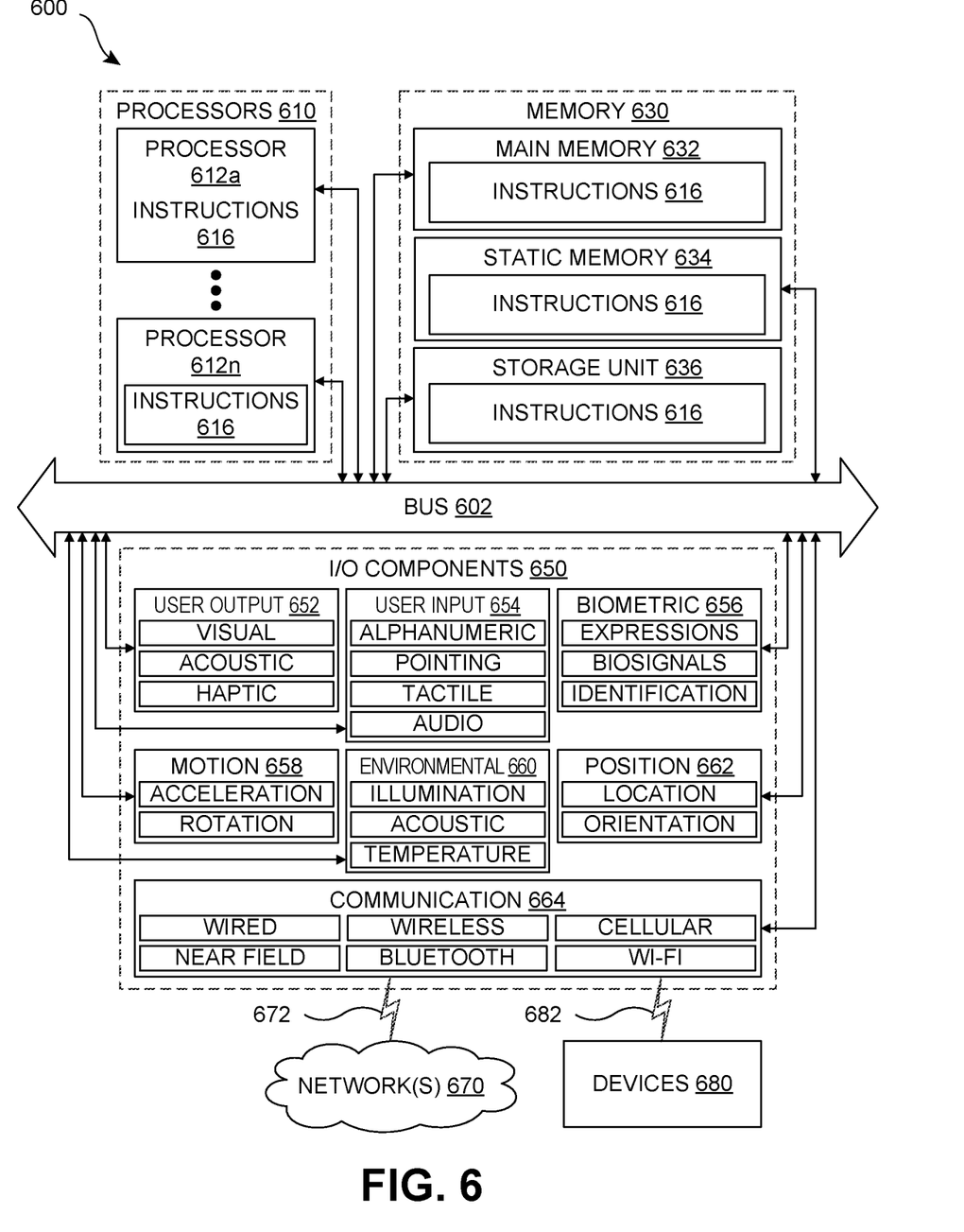
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" include a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
   a processor; and
   a memory in communication with the processor, the memory comprising executable instructions that, when executed by the processor, cause the device to perform functions of:
      receiving a notification from an event tracking application via a network, the notification indicating that a change was made to a first branch of a source code configuration and the notification being sent by the event tracking application upon receiving information from a source depository server;
      identifying a second branch of the source code configuration that does not include the change;
      automatically incorporating the change into the second branch;
      determining if the automatic incorporation of the change was successful; and
      transmitting a first indication to a work tracking application to update a task entry depending on results of the determining if the automatic incorporation of the change was successful.

2. The device of claim 1, wherein the executable instructions when executed by the processor further cause the device to perform functions of:
   upon receiving the notification, sending a second indication to the work tracking application to create the task entry for the change; and sending a third indication to the work tracking application to initiate notifying an individual if it is determined that the automatic incorporation is unsuccessful.

3. The device of claim 2, wherein the task entry is assigned to the individual.

4. The device of claim 2, wherein the executable instructions when executed by the processor further cause the device to perform functions of:
enabling the individual to incorporate the change, when it is determined that the automatic incorporation was unsuccessful; and
notifying the work tracking application to automatically update the task entry after it is determined that manual incorporation is complete.

5. The device of claim 1, wherein the executable instructions when executed by the processor further cause the device to perform functions of sending a second indication to the work tracking application to update the task entry to an inactive status if it is determined that the automatic incorporation is successful.

6. The device of claim 1, wherein identifying the second branch comprises:
identifying one or more primary branches of the source code configuration;
examining the identified primary branches to identify active branches among the identified primary branches;
examining the identified active branches to detect branches that were created in the source code configuration after the first branch;
comparing a source code of the detected branches to a source code of a merged root of the first branch with a master branch of the source code to determine if there are differences between the detected branches and the merged root; and
designating any branch identified as having differences as the second branch.

7. The device of claim 6, wherein the executable instructions when executed by the processor further cause the device to perform functions of sending a second notification to create a task entry for each branch identified as the second branch.

8. A method for incorporating a source code change made in a first branch of a source code configuration into a second branch of the source code configuration comprising:
receiving a notification from an event tracking application via a network, the notification indicating that a change was made to the first branch and the notification being sent by the event tracking application upon receiving information from a source depository server;
identifying the second branch as a branch of the source code configuration that does not include the change;
automatically incorporating the change into the second branch;
determining if the automatic incorporation of the change was successful; and
transmitting a first indication to a work tracking application to update a task entry depending on results of the determining if the automatic incorporation of the change was successful.

9. The method of claim 8, further comprising:
upon receiving the notification, sending a second indication to the work tracking application to create the task entry for the change; and
sending a third indication to the work tracking application to initiate notifying an individual if it is determined that the automatic incorporation is unsuccessful.

10. The method of claim 9, wherein the task entry is assigned to the individual.

11. The method of claim 9, further comprising:
enabling the individual to incorporate the change, when it is determined that the automatic incorporation was unsuccessful; and
notifying the work tracking application to automatically update the task entry after it is determined that manual incorporation is complete.

12. The method of claim 8, further comprising sending a second indication to the work tracking application to update the task entry to an inactive status if it is determined that the automatic incorporation is successful.

13. The method of claim 8, wherein identifying the second branch comprises:
identifying one or more primary branches of the source code configuration;
examining the identified primary branches to identify active branches among the identified primary branches;
examining the identified active branches to detect branches that were created in the source code configuration after the first branch;
comparing a source code of the detected branches to a source code of a merged root of the first branch with a master branch of the source code to determine if there are differences between the detected branches and the merged root; and
designating any branch identified as having differences as the second branch.

14. The method of claim 8, further comprising creating a task entry for each branch identified as the second branch.

15. A device comprising:
a processor; and
a memory in communication with the processor, the memory comprising executable instructions that, when executed by the processor, cause the device to perform functions of:
receiving a notification from an event tracking application via a network, the notification indicating that a first branch was created in a source code configuration and the notification being sent by the event tracking application upon receiving information from a source depository server;
identifying a second branch in the source code configuration that was created before the first branch;
determining if a change was made to the second branch after creation of the first branch;
upon determining the change was made to the second branch, determine if the change exists in the first branch;
automatically incorporating the change into the first branch, upon determining that the change does not exist in the first branch.

16. The device of claim 15, wherein the instructions further cause the programmable device to perform functions of sending a first indication to a work tracking application to create a task entry for the change and to assign the task entry to an individual, upon determining that the change does not exists in the first branch.

17. The device of claim 16, wherein the instructions further cause the programmable device to perform functions of sending a second indication to the work tracking application to notify the individual if it is determined that automatic incorporation of the change into the first branch was unsuccessful.

18. The device of claim 17, wherein the instructions further cause the programmable device to perform functions of enabling manual incorporation of the change into the first branch upon determining that automatic incorporation of the change into the first branch was unsuccessful.

19. The device of claim 18, wherein the instructions further cause the programmable device to send a third indication to the work tracking application to update the task entry when it is determined that incorporation into the first branch is successful.

20. The device of claim 15, wherein identifying the second branch comprises:
   identifying one or more primary branches of the source code configuration;
   examining the identified primary branches to identify active branches among the identified primary branches;
   examining the identified active branches to detect branches that were created in the source code configuration before the first branch.

* * * * *